United States Patent [19]
Taillardat

[11] 3,869,936
[45] Mar. 11, 1975

[54] MECHANISM FOR CONVERTING A MOVEMENT OF TRANSLATION INTO A ROTATIONAL MOVEMENT, AND VICE VERSA

[75] Inventor: Jacques Taillardat, Saint Alban En Leysse, France

[73] Assignee: La Technique Integrale, Chambery, France

[22] Filed: Oct. 23, 1973

[21] Appl. No.: 408,361

[30] Foreign Application Priority Data
Oct. 20, 1972  France .............................. 72.37323

[52] U.S. Cl. ............................... 74/459, 74/424.8
[51] Int. Cl. ............................................ F16h 55/04
[58] Field of Search .................... 74/459, 424.8, 499

[56] References Cited
UNITED STATES PATENTS
| | | | |
|---|---|---|---|
| 2,505,131 | 4/1950 | Mean, Jr. ............................. | 74/459 |
| 2,519,777 | 8/1950 | Cochrane ............................ | 74/459 |
| 2,636,397 | 4/1953 | Jacubenta ........................... | 74/459 |
| 3,529,486 | 9/1970 | Galonska et al. ................... | 74/459 |

*Primary Examiner*—Wesley S. Ratliff, Jr.
*Attorney, Agent, or Firm*—Daniel M. Rosen

[57] ABSTRACT

This invention relates to a ball screw and nut mechanism, which comprises a screw member, a nut member, balls inserted between said members and at least one coupling member, engaging the helical groove of the nut member between one end of a passage for recirculating the balls and the adjacent end face of said nut member. This coupling member is secured in the corresponding portion of the helical groove of the screw member for maintaining a helical coupling between the screw and nut members in case the balls have escaped from the nut member or are destroyed.

7 Claims, 10 Drawing Figures

MECHANISM FOR CONVERTING A MOVEMENT OF TRANSLATION INTO A ROTATIONAL MOVEMENT, AND VICE VERSA

BACKGROUND OF THE INVENTION

This invention relates to a ball screw and nut mechanism for converting a movement of translation into a rotational movement and vice-versa.

Mechanisms of this type are already known, wherein each helical groove of the nut has a ball-extraction point located at a short predetermined distance from one of the end faces of the nut, a point for re-introducing the balls, also located at a short predetermined distance from the other end face of the nut, means such as tubes or channels machined through the nut wall further provided for recirculating the balls between each extraction point and each corresponding re-introduction point.

In case of accidental escape or destruction of the balls included in these known mechanisms for converting movements, a sudden break occurs in the coupling between the members associated with the screw and nut mechanism, respectively, and this way even prove extremely dangerous, notably in certain applications of these movement-transforming mechanisms; thus, more particularly, a sudden separation between the screw and nut may take place, as a consequence of a rapid movement of translation of the nut in relation to the screw.

SUMMARY OF THE INVENTION

The ball screw and nut mechanism according to this invention, is free of the above mentioned inconveniences of the previously known mechanisms of this type.

The ball screw and nut mechanism according to this invention comprises a screw member and a nut member with a first and a second end face, each member having at least one helical groove, which grooves together define at least one helical passage, a train of balls in said helical passage permitting transmission of movement between the members, a ball re-circulation passage formed in said nut member, the ends of said re-circulation passage opening in the bottom of the helical groove of said nut member, respectively at a first ball-extraction point and at a second ball re-introduction point, said first and second points being located at short predetermined distances from first and second end faces of said nut member, respectively and at least one coupling member or deflector secured to said nut member and disposed at least partly in a portion of said helical groove extending from said first or second end face to said first or second point, said coupling member having a cross section adapted to that of said helical passage and having a mechanical strength congruent to the maximal axial force to be transmitted between screw and nut members in case the balls escaped from said helical passage or were destroyed. In this last case, in fact, the screw and nut of the mechanism according to this invention remain coupled to each other through the coupling member or members incorporated in the nut, thus precluding any sudden break in the coupling between the members rigid with the screw and nut, respectively, the coupling member or members being so dimensioned that it is capable of withstanding the maximal force to be transmitted between the screw and the nut; moreover, a sudden separation between the screw and nut as a consequence for example of a very rapid movement of translation produced between these two members, cannot take place since the above-mentioned coupling members permit only helical relative movements of the screw and nut.

Prior art also comprises associating with the nut of a ball screw mechanism at least one so-called "parachute" nut, which is a ball-free nut dimensioned to be screwed directly to the screw and thus prevents same from being separated from the ball-receiving nut under the accidental circumstances mentioned hereinabove; however, these parachute nuts are objectionable in that they constitute elements independent of the ball-receiving nut, thus increasing the weight and cost of the corresponding mechanism as well as the over-all length of the nut system; this last inconvenience proves to be detrimental in certain applications of the contemplated mechanisms. In contrast thereto, the mechanism according to this invention has a single nut incorporating both the balls and the coupling member or members; therefore, the above-mentioned safety or parachute feature is obtained without appreciably increasing the axial length of the ball-receiving nut, inasmuch as the coupling members are disposed in end portions of a helical groove of the ball-receiving nut, beyond the points provided for extracting and re-introducing the balls, i.e. in portions of said helical groove where no balls are permitted to circulate.

In a preferred embodiment of the ball mechanism of this invention, the coupling member has substantially the shape of a helical torus having in cross section a diameter slightly less than that of the balls; on the other hand, the coupling member comprises, preferably in its center or intermediate its ends, at least one transverse or radial projection, engageable in a radial hole formed in said nut and retained therein by any suitable means.

BRIEF DESCRIPTION OF THE DRAWING

Typical embodiments of the invention will now be described by way of example with reference to the attached drawings, in which.

DESCRIPTION OF THE PREFERRED EMBODIMENT

Figure 1:
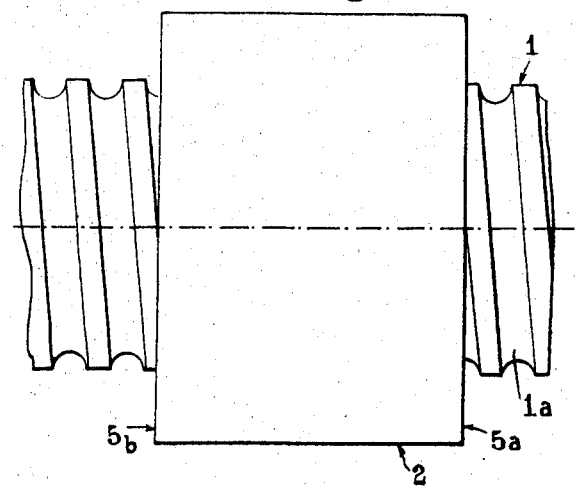
FIG. 1 is a side elevational view of a preferred embodiment of the mechanism according to this invention.
Figure 2:
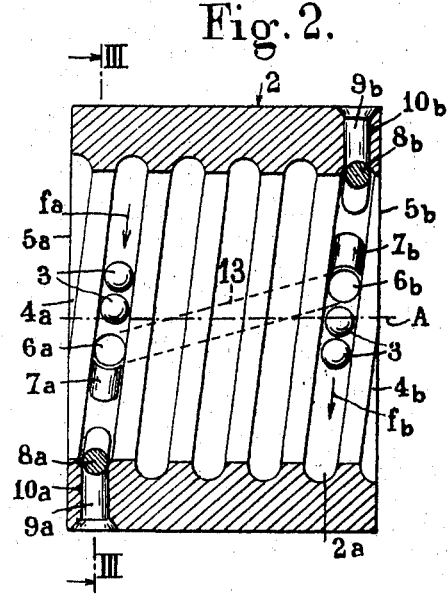
FIG. 2 is an axial section of the nut of the mechanism shown in FIG. 1.

In FIG. 1 the reference numeral 1 designates a screw in which a single helical groove 1a having a substantially semi-circular cross-sectional contour is formed. A nut 2 is associated with this screw 1 and, as shown in FIG. 2, has also formed therein a helical inner groove 2a of same pitch and cross-sectional contour as the groove 1a of screw 1. A plurality of balls 3 of suitable diameter are engaged between the screw 1 and 2 in the helical channel formed by the two adjacent helical grooves 1a and 2a, to constitute the screw-threads. In FIG. 2 it is clearly apparent that the helical groove 2a of nut 2 opens respectively at 4a and 4b into the end faces 5a and 5b, respectively, of nut 2, and that the points where the balls 3 are extracted and re-introduced lie substantially somewhat downstream of one of said end faces 5a, 5b of nut 2, and slightly upstream of the opposite face. In the embodiment contemplated herein the means provided for extracting and re-introducing the balls comprises, as shown in FIG. 2, a ball re-circulation passage 13 (FIG. 2) formed in the thickness of nut 2 and opening at 6a and 6b into the bottom of groove 2a, at relatively short distances from the corresponding end faces 5a and 5b of said nut 2. Just past each hole 6a and 6b, on the side adjacent the nearest end, 4a or 4b, of the helical groove 2a, a member designated by the reference symbol 7a or 7b is secured through any suitable means to the bottom of the helical groove 2a of nut 2, for example by welding, the function of this member 7a or 7b consisting in blocking the balls 3 travelling in the helical groove 2a in the direction of the arrow $f_hd\ a$, and guiding said balls towards the relevant opening 6a, or alternatively guiding said balls 3 emerging from the opening 6b of re-circulation passage 13 so that they can engage said helical groove 2a only in the direction of the arrow $f_b$.

Figure 3:
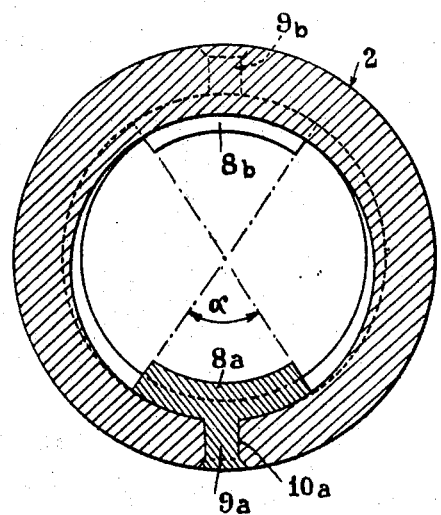
FIG. 3 is a section taken along the line III—III of FIG. 2.
Figure 4:
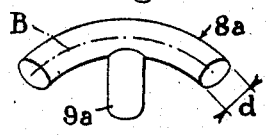
FIGS. 4 to 6 illustrate diagrammatically three different embodiments of a coupling member for the mechanism according to this invention.

According to this invention at least one coupling member having for example the shape shown in FIG. 4 is secured to the nut 2 in the portion of its helical groove 2a which extends between one of the points for extracting or re-introducing the balls, 6a–7a or 6b–7b, and the adjacent end face 5a or 5b of said nut; in the embodiment illustrated, two such coupling members 8a and 8b are provided, each member having the shape, illustrated in FIG. 4, of a segment of a helical torus having in cross section a diameter $d$ slightly less than that of said balls 3 (FIG. 2); each coupling member 8a, 8b comprises, in the embodiment contemplated, a projection or shank 9a or 9b extending from the middle point thereof; this projection 9a or 9b is force fitted in a radial hole 10a or 10b formed in the nut 2; in the embodiment illustrated, the two coupling members 8a and 8 b are disposed on either side of the axis A of nut 2 and each member, as shown in FIG. 3, has an angular width $\alpha$ consistent with the distance measured between the guide members 7a, 7b and the relevant end 4a or 4b of the helical groove 2a of nut 2, this distance being measured along this groove. Finally, the strength of the material constituting each coupling member 8a and 8b as well as the dimensions of its various portions are computed with a view to withstand the maximum axial stress produced between the screw 1 and nut 2 in case the balls 3 escaped or were destroyed. This last feature will be explained more in detail presently with reference to FIGS. 7 to 10 of the drawings.

Figure 7:
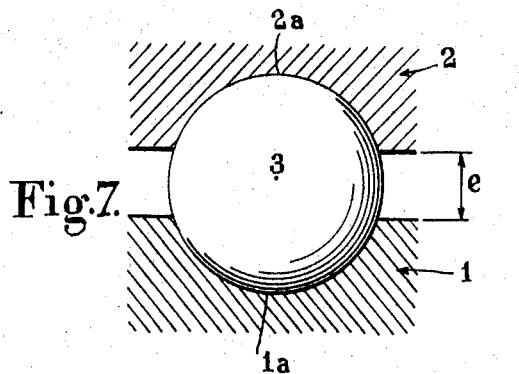
FIG. 7 to 10 are diagrams showing on a larger scale the function of the coupling member in a ball screw and nut mechanism according to this invention.
Figure 8:
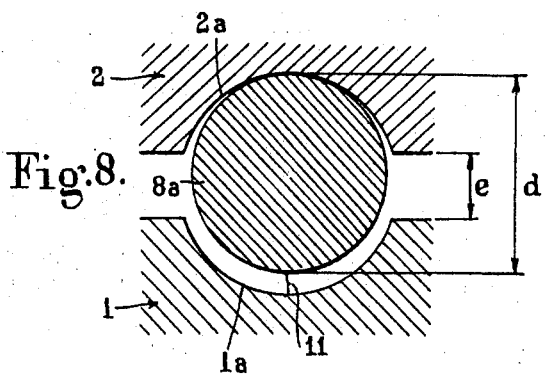

FIG. 7 is a section taken in a plane perpendicular to the axis of the helical channel defined by the helical grooves 1a and 2a of screw 1 and nut 2, respectively, the aforesaid plane being selected to be coincident with the diametral plane of a ball 3; in this FIG. 7 it is clear that, when the mechanism of this invention operates normally, the balls 3 maintain between the threads of screw 1 and those of nut 2, registering with each other, a gap $e$ having a constant value from the end face 5a to the opposite end face 5b of nut 2. FIG. 8 is a section taken in a plane corresponding to that of FIG. 7 but at right angle to the curved longitudinal axis B of the coupling member 8a (FIG. 4); at the level of this plane, and considering the same normal operation of the mechanism, the same gap $e$ is maintained between the threads of screw 1 and those of nut 2, and since the diameter $d$ of said coupling member 8a is smaller than the diameter of balls 3, a gap 11 is left between each coupling member such as 8a and the bottom of the helical groove 1a of screw 1.

Figure 9:
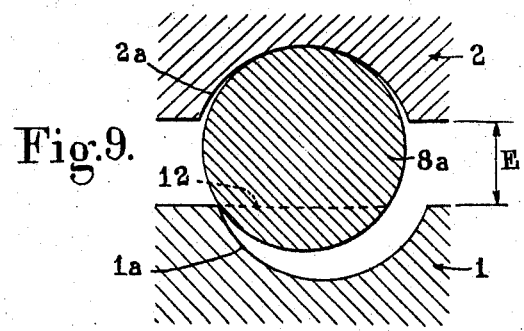
Figure 10:
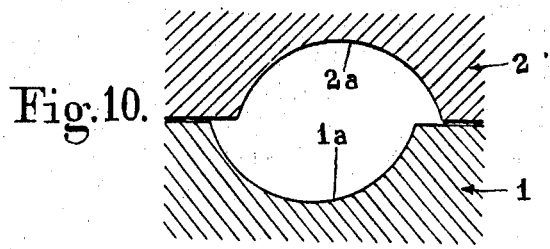

FIGS. 9 and 10 illustrate the conditions arising in case the balls 3 escaped accidentally from the nut 2 of the mechanism of the present invention and, furthermore, in case the screw and nut are no more in mutual axial alignment as a consequence of stress exerted thereon; the plane of FIG. 10 corresponds to that of FIG. 7; in fact, the escape or destruction of a ball 3 would cause the aforesaid stress to reduce the relative spacing between the threads of screw 1 and nut 2; on the other hand, the plane of FIG. 9 corresponds to that of FIG. 8; said FIG. 9 shows that in the aforementioned accidental occurrence this reduction in the relative spacing between the screw 1 and nut 2 at one end of said nut 2 was attended, especially at the opposite end, by an increment in the relative spacing between the threads of screw 1 and those of nut 2, up to a value E greater than the normal value $e$ (FIGS. 7 and 8); the axial misalignment of the screw and nut was attended on the other hand by the shearing of the radial branch or arm (FIG. 9) of the coupling member 8a by one of the edges of the helical groove 1a of screw 1; consequently, the section 12 of coupling member 8a (in dash lines in FIG. 9) should be so dimensioned as to withstand one-half of the maximum stress to be transmitted between screw 1 and nut 2, in the aforesaid accidental condition, since two coupling members 8a and 8b are provided in the embodiment described and illustrated herein.

Reverting to FIG. 2, it is clearly apparent in this Figure that the portion of the helical groove 2a of nut 2 which is intended for circulating the balls 3 has an axial extent differring but only very slightly from the axial length of nut 2, and therefore the use of the coupling members according to this invention has substantially no appreciable reducing effect on the useful axial length of the nut in the movement transforming mechanism of this invention.

The above-described embodiment of the mechanism according to this invention may be the subject of to many modifications, of which a few will now be mentioned by way of illustration, not of limitation.

Figure 5:
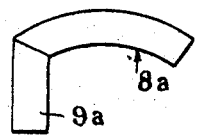
Figure 6:
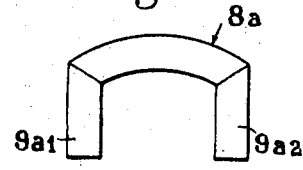

Thus, each coupling member may assume for instance one of the shapes illustrated in FIGS. 4 to 6, i.e., with the projection 9a disposed at its centre, as shown in FIG. 4, or at one end, as shown in FIG. 5; each coupling member such as 8a may also comprise, as illustrated in FIG. 6, a pair of end projections $9a_1$ and $9a_2$, engaging two corresponding radial holes formed in the thickness of nut 2, for example. The number of these coupling members inserted in the nut of the mechanism of this invention is also optional, and a single coupling member disposed at one end of the nut may prove sufficient, provided that its dimensions are properly computed. If the screw and nut mechanism comprises several threads, the nut may be provided with more than two coupling members according to this invention, and notably the number of pairs of such coupling members may correspond to the number of threads in the nut. The relative positions of the various coupling members are also optional; in the example shown in FIG. 2 it is not definitely necessary that the two coupling members 8a and 8b lie in a common plane, on either side of the axis A of nut 2; in fact, these coupling members may be disposed in any desired and suitable angular relationship about this axis A. The material, shape and dimensions of each coupling member incorporated in the mechanism of this invention are also optional, the same applying to the method of fastening or securing these members to the nut. In the case of coupling members having a transverse projection as shown in FIGS. 4 to 6, the projection or projections may be fitted and retained in corresponding transverse holes of said nut, by using any suitable and known means such as cementing, keying, screwing, etc. Coupling members free of any such projections fall likewise within the scope of the invention, as well as coupling members secured by other means to the bottom of the helical grooves of the nut, for instance by cementing, welding, force-fitting, etc.

Since the free portion of each coupling member incorporated in the nut of the mechanism of this invention engages the corresponding portion of the helical groove formed in the screw, this portion of each coupling member may be used as a scraper by associating a pad of flexible material such as felt, rubber or cellular synthetic material, brush hair, etc. therewith, in order to produce a permanent cleaning action in the bottom of the helical grooves of said screw.

In a modified embodiment of the screw and nut mechanism of this invention, the screw comprises at least one end stop means for limiting the nut movement, and the coupling member is disposed in the corresponding end of the nut so as to engage said screw stop means before the corresponding end face of the nut; thus, not only this end face but also the balls are safely protected.

Of course, this invention should not be construed as being strictly limited to a specific embodiment of the means provided for extracting and re-circulating the balls in the helical groove or grooves of the nut, which means are referred to as "points" hereinabove; consequently, the coupling members according to this invention may be adapted to ball nuts of existing types and already provided with any suitable and known means for extracting and re-introducing the balls. However, for the coupling members according to this invention there is a particularly advantageous embodiment wherein they co-act with balls, and notably with respect to the extraction of said balls from the helical channel, and also to the re-introduction thereof into said channel; in this advantageous embodiment of the mechanism according to the present invention, the coupling member is so arranged and positioned in relation to the adjacent point of extraction or re-introduction of said balls that it assists in guiding the balls when they pass by these points. In fact, referring again to FIG. 2, it will be seen that it is easy to eliminate the guide members 7a and 7b, and to protract the corresponding portions of coupling members 8a and 8b up to the adjacent edges of the openings 6a and 6b of recirculation passage 13, so that the relevant ends of said coupling members 8a and 8b will play the same role as said guide members 7a and 7b, the end portions of said coupling members 8a, 8b being also adapted to be shaped with a view to ensure the best possible guiding action on the balls during their passage from the helical groove 2a, on the one hand, to the opening of recirculation passage 13, on the other hand.

What is claimed as new is:

1. In a re-circulating ball, screw-and-nut device including screw and nut members which each have defined in its mating surface a helical groove, said members when in cooperating relationship defining between them a helical passage of generally circular cross section formed by said grooves with a train of balls situated and movable in said passage, whereby rotary movement of one of said members relative to the other causes axial movement of the other, the improvement in combination therewith wherein said nut member comprises a cylinder whose wall has opposite first and second ends, and extending within said wall is a ball recirculation passage the ends of which open into the helical groove of said nut member respectively at a first ball-extraction point axially inward of said first end and at a second ball re-introduction point axially inward of said second end, the device further comprising at least one coupling member extending from said nut member into said passage, said coupling member having a cross section closely corresponding to that of said passage and being situated axially outward of one of said first and second points, and means extending from said nut member into said passage and adjacent one of said points for deflecting said balls from said helical passage into said re-circulation passage.

2. A device according to claim 1 wherein said coupling member comprises a helical torus shape part situated in said helical passage, this part having a cross-sectional diameter slightly less than that of said balls.

3. A device according to claim 2 wherein said coupling member comprises a shank part that projects transverse of said torus part and extends outward and is secured into said nut wall.

4. A device according to claim 1 wherein said coupling member comprises a flexible pad part engaging said helical groove of said screw member and operable as a scraper.

5. A device according to claim 1 wherein said screw member comprises at a position along its length a stop means, and said coupling member comprises a stop part projecting inward toward the nut's axis beyond an end of the nut, whereby axial movement of the nut relative to the screw member is limited by contact of said stop means with the stop part.

6. A device according to claim 1 wherein said two members and balls have a design strength to remain operable when subjected to a predetermined axial force of one member relative to the other, and said coupling member with said screw and nut members has substantially the same strength to maintain the device operable should any of said balls fail to provide said design strength.

7. In a re-circulation ball, screw-and-nut device including screw and nut members which each have defined in its mating surface a helical groove, said members when in cooperating relationship defining between them a helical passage of generally circular cross section formed by said grooves with a train of balls situated and movable in said passage, whereby rotary movement of one of said members relative to the other causes axial movement of the other, the improvement in combination therewith wherein said nut member comprises a cylinder whose wall has opposite first and second ends and extending within said wall is a ball recirculation passage the ends of which open into the helical groove of said nut member respectively at a first ball-extraction point axially inward of said first end and at a second ball re-introduction point axially inward of said second end, the device further comprising one coupling member extending from said nut member into said passage, said coupling member having a cross section closely corresponding to that of said passage and being situated axially outward of said first point, a second similar coupling member situated axially outward of said second point, and means extending from said nut member into said passage and adjacent each of said points for deflecting said balls from said helical passage into said re-circulation passage.

* * * * *

UNITED STATES PATENT OFFICE
CERTIFICATE OF CORRECTION

Patent No. 3,869,936　　　　　　　Dated March 11, 1975

Inventor(s) Jacques Taillardat

It is certified that error appears in the above-identified patent and that said Letters Patent are hereby corrected as shown below:

Column 1, line 17, after "wall" insert --being--.

Column 1, line 24, replace "way" with --may--.

Column 3, line 22, replace "fhda" with --fa--.

Column 4, line 47, delete "to" at the end of the line.

Cancel Figs. 4, 5 and 6, and substitute therefor the following new Figs. 4, 5 and 6:

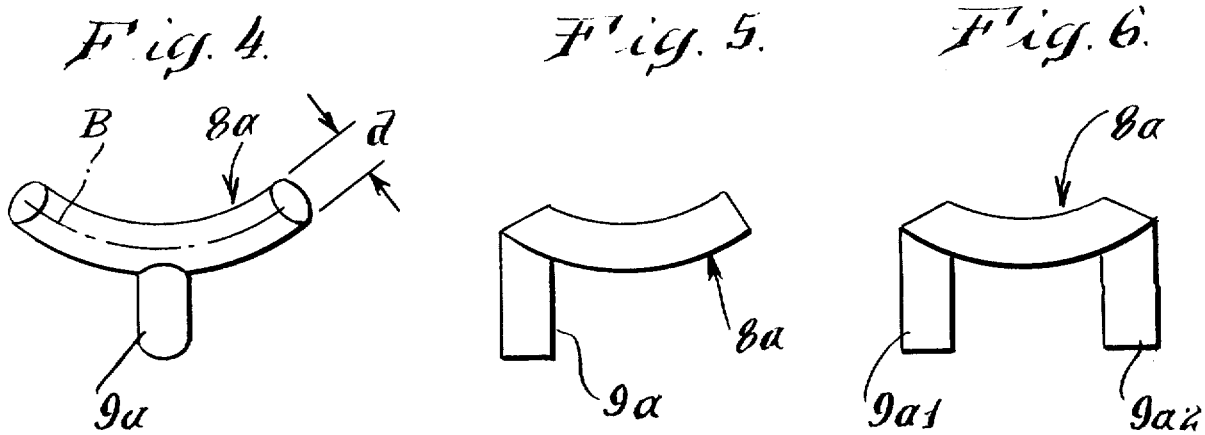

Signed and Sealed this thirteenth Day of January 1976

[SEAL]

Attest:

RUTH C. MASON  　　　　　C. MARSHALL DANN
Attesting Officer  　　　　Commissioner of Patents and Trademarks